US011709240B2

(12) United States Patent
Rezk et al.

(10) Patent No.: US 11,709,240 B2
(45) Date of Patent: Jul. 25, 2023

(54) DESCAN COMPENSATION IN SCANNING LIDAR

(71) Applicant: Aeva, Inc., Mountain View, CA (US)

(72) Inventors: Mina Rezk, Haymarket, VA (US); Neal N. Oza, Palo Alto, CA (US); Keith Gagne, Santa Clara, CA (US); Omer P. Kocaoglu, Fremont, CA (US)

(73) Assignee: Aeva, Inc., Mountain View, CA (US)

( * ) Notice: Subject to any disclaimer, the term of this patent is extended or adjusted under 35 U.S.C. 154(b) by 1177 days.

(21) Appl. No.: 16/164,566

(22) Filed: Oct. 18, 2018

(65) Prior Publication Data

US 2020/0124711 A1 Apr. 23, 2020

(51) Int. Cl.
*G01S 7/499* (2006.01)
*G01S 7/481* (2006.01)
*G01S 17/10* (2020.01)

(52) U.S. Cl.
CPC ............ *G01S 7/499* (2013.01); *G01S 7/4812* (2013.01); *G01S 7/4815* (2013.01);
(Continued)

(58) Field of Classification Search
CPC ...... G01S 7/499; G01S 7/4812; G01S 7/4815; G01S 7/4816; G01S 7/4817; G01S 17/10
See application file for complete search history.

(56) References Cited

U.S. PATENT DOCUMENTS 5,114,226 A 5/1992 Goodwin et al.
8,687,173 B2 4/2014 Rezk et al.
(Continued)

FOREIGN PATENT DOCUMENTS

EP 3187899 A2 7/2017
JP 2011503526 A 1/2011
JP 2012402301 A 1/2012

OTHER PUBLICATIONS

Rodriguez, Joshua, et al. "Beam steering by digital micro-mirror device for multi-beam and single-chip lidar." Optical Data Storage 2018: Industrial Optical Devices and Systems. vol. 10757. International Society for Optics and Photonics, 2018. (Year: 2018).*
(Continued)

*Primary Examiner* — Luke D Ratcliffe
(74) *Attorney, Agent, or Firm* — Womble Bond Dickinson (US) LLP

(57) ABSTRACT

A light detection and ranging (LIDAR) apparatus is provided that includes a laser source configured to emit a laser beam in a first direction. The apparatus also includes lensing optics configured to pass a first portion of the laser beam in the first direction toward a target, return a second portion of the laser beam into a return path as a local oscillator signal, and return a target signal into the return path. The apparatus also includes a quarter-wave plate configured to polarize the laser beam headed in the first direction and polarize the target signal returned through the lensing optics. The apparatus also includes a polarization beam splitter configured to pass non-polarized light through the beam splitter in the first direction and reflect polarized light in a second direction different than the first direction, wherein the polarization beam splitter is further configured to enable interference between the local oscillator signal and the target signal to generate a mixed signal. The apparatus also includes an optical detector configured to receive the mixed signal.

19 Claims, 12 Drawing Sheets

(52) U.S. Cl.
CPC .......... *G01S 7/4816* (2013.01); *G01S 7/4817* (2013.01); *G01S 17/10* (2013.01)

(56) References Cited

U.S. PATENT DOCUMENTS

| | | |
|---|---|---|
| 8,891,069 B2 | 11/2014 | Pedersen et al. |
| 2005/0002013 A1 | 6/2005 | Harris |
| 2006/0227317 A1* | 10/2006 | Henderson .............. G01S 17/89 356/28 |
| 2010/0277714 A1* | 11/2010 | Pedersen ................. G01S 7/497 356/28 |
| 2011/0205523 A1* | 8/2011 | Rezk .................. G01B 9/02004 356/5.09 |
| 2018/0275249 A1* | 9/2018 | Campbell ............. G01S 7/4814 |

OTHER PUBLICATIONS

Transmittal of the International Search Report and Written Opinion of the International Searching Authority dated, Nov. 20, 2019, for International Application No. PCT/US2019/052262, filed Sep. 20, 2019, pp. 12.

Transmittal of International Preliminary Report on Patentability dated Apr. 29, 2021, for International Application No. PCT/US2019/052262, filed Sep. 20, 2019, pp. 9.

JP Office Action dated May 30, 2023, from related JP Application No. 2021-521124, (and machine translatin); 3 pages.

\* cited by examiner

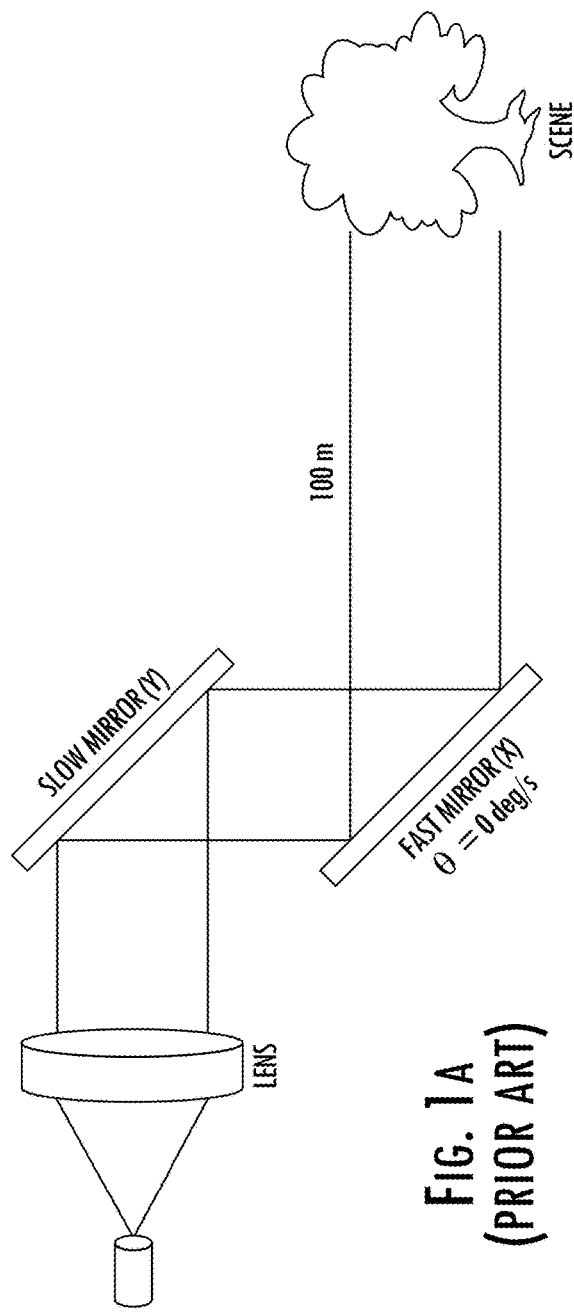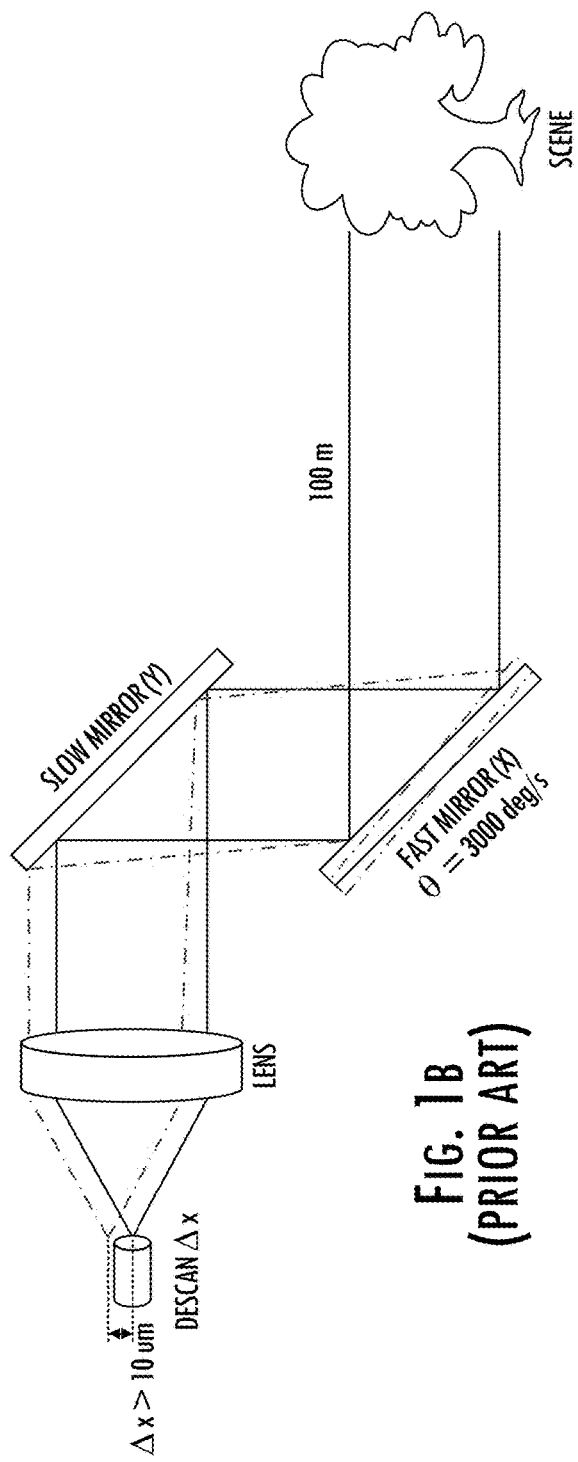
FIG. 1A (PRIOR ART)
FIG. 1B (PRIOR ART)

DESCAN COMPENSATION IN SCANNING LIDAR

TECHNOLOGICAL FIELD

The present disclosure relates generally to light detection and ranging (LIDAR) that provides simultaneous measurement of range and velocity across two dimensions.

BACKGROUND

Fast-scanning mirrors are the primary components used to illuminate a scene in most conventional LIDAR systems. As shown in FIG. 1A, one mirror typically scans quickly along the X direction (azimuth), while another mirror scans slowly along the Y direction (elevation). Light emission and detection from target reflections are done coaxially, typically via a single mode fiber. The collected light has a measured delay or an altered frequency signature that is used to extract range, and potentially velocity, information. A 3D point cloud can be established when the point-wise detected range information is combined with angular position feedback from the scanning mirrors.

To achieve higher frame rates, the mirror's angular velocity is increased, especially that of the scanner in faster scan direction (X scanner in our case). When using the mirrors with a high angular velocity (for example, faster than 3000 degrees per second) and single-mode fiber-based detection, the target signal from distant objects is severely degraded. Signal degradation is mainly due to the difference in angular position of the scanner mirror from the launch time of the laser signal (pulsed or frequency swept) to the collection time of the same signal from a distant scattering target. This slight angular change causes a walk-off of the target signal at the fiber tip decreasing the coupling efficiency, which manifests itself as a weaker signal detection. Such degradation becomes more severe as the fiber diameter decreases, e.g. a single mode fiber with ~10 µm diameter, or as the mirror's angular velocity increases.

BRIEF SUMMARY

Example implementations of the present disclosure are directed to an improved scanning LIDAR system. Example implementations of the present disclosure are based on a type of LIDAR that uses frequency modulation (FM) and coherent detection to overcome the shortcomings of traditional LIDAR systems and the limitations of prior FM LIDAR systems. Historically, FM LIDAR systems suffer from significant losses in the beam's return path; thus, such systems, which are often quite bulky, require a higher average beam output power to measure distances comparable to time-of-flight (TOF) LIDAR systems. Alas, the range is limited by the operating distance for eye-safe output powers.

Example implementations of the present disclosure are configured to simultaneously measure the range and velocity, using coherent detection and having the added benefit of immunity to crosstalk from other LIDAR systems. Other implementations may be used with incoherent systems to improve, range, framerate, or detection. Example implementations minimize optical losses in the beam's return path, thereby increasing the system's measurement range. Additionally, by using nondegenerate laser sources, example implementations can leverage mature wavelength division multiplexing (WDM) techniques often used in integrated silicon photonics, a desired platform due to its compactness and relative stability in varying environmental conditions.

As described above, the decenter at the fiber tip upon return of the target signal is the primary source of degradation in coupling efficiency. Example implementations of the present disclosure mitigate the hampering effect of the decentered return light at the fiber tip by separating the optical detection from the primary source fiber. The light leaving the system can be polarized with a quarter wave plate (QWP). After the QWP, a portion of the light can be reflected back toward the system as a local oscillator (LO), while the remaining light travels to the environment and may be reflected back by one or more objects within system's field-of-view (FOV). When the light from a target returns, it interferes with the LO signal to form a combined signal. Because the combined signal is polarized, it can be reflected from a polarization beam splitter to one or more optical detectors that are separate from the laser source. Because the beams have interfered before the optical detectors and the detection path is decoupled from source path, the optical detectors can be larger core fibers or waveguides, silicon-based optical detectors, or other types of optical detectors that can sense the combined signal.

The present disclosure thus includes, without limitation, the following example implementations.

Some example implementations provide a light detection and ranging (LIDAR) apparatus comprising: a laser source configured to emit a laser beam in a first direction; lensing optics configured to pass a first portion of the laser beam in the first direction toward a target, return a second portion of the laser beam into a return path as a LO signal, and also collect signals from external targets into the return path; a polarization wave plate configured to transform the polarization states of the laser beam headed in the first direction and of the target signal returned through the lensing optics such that these polarizations are orthogonal; a polarization beam splitter configured to pass polarized light through the beam splitter in the first direction and reflect orthogonally polarized light in a second direction different than the first direction, wherein the polarization beam splitter is further configured to enable interference between the local oscillator signal and the target signal to generate a mixed signal; and an optical detector configured to receive this mixed signal.

In some example implementations of the LIDAR system of any preceding example implementation, or any combination of preceding example implementations further comprise a second laser source and a second optical detector.

In some example implementations of the LIDAR system of any preceding example implementation, or any combination of preceding example implementations further comprise a wavelength division multiplexer to direct the signals to multiple optical detectors and wherein the laser source provides multi-wavelength laser beams.

In some example implementations of the LIDAR system of any preceding example implementation, or any combination of preceding example implementations the polarization wave plate comprises one of a quarter-wave plate or a half-wave plate.

In some example implementations of the LIDAR system of any preceding example implementation, or any combination of preceding example implementations further comprise lensing to collimate the laser beam through the polarization beam splitter.

In some example implementations of the LIDAR system of any preceding example implementation, or any combination of preceding example implementations, the laser source and optical detector are on a same printed circuit board or integrated photonic chip with a fold mirror to direct the returned light to the optical detector.

In some example implementations of the LIDAR system of any preceding example implementation, or any combination of preceding example implementations, the fold mirror further comprises a wavelength division multiplexer coating to reflect a first wavelength of light to the optical detector and allow a second wavelength of light to pass to a second fold mirror and reflect to a second optical detector.

In some example implementations of the LIDAR system of any preceding example implementation, or any combination of preceding example implementations further comprise a second laser source, wherein the laser source and the second laser source each provide multi-wavelength laser beams.

In some example implementations of the LIDAR system of any preceding example implementation, or any combination of preceding example implementations, the lensing optics further comprise a reflector or a coating to generate the return light as the local oscillator signal.

Some example implementations provide a light detection and ranging (LIDAR) apparatus comprising a system comprising: a fast scanning mirror to direct a laser beam to scan a scene; optical circuits to generate and receive the laser beam, the optical circuits comprising: a laser source configured to emit a laser beam in a first direction; lensing optics configured to pass a first portion of the laser beam in the first direction toward a target, return a second portion of the laser beam into a return path as a LO signal, and return a target signal into the return path; a QWP configured to transform the polarization states of the laser beam headed in the first direction and of the target signal returned through the lensing optics such that these polarizations are orthogonal; a polarization beam splitter configured to pass polarized light through the beam splitter in the first direction and reflect orthogonally polarized light in a second direction different than the first direction, wherein the polarization beam splitter is further configured to enable interference between the LO signal and the target signal to generate a mixed signal; and an optical detector configured to receive the mixed signal.

In some example implementations of the LIDAR system of any preceding example implementation, or any combination of preceding example implementations, the lensing optics further comprise a second laser source and a second optical detector.

In some example implementations of the LIDAR system of any preceding example implementation, or any combination of preceding example implementations, the lensing optics further comprise a wavelength division multiplexer to direct the signals to multiple optical detectors and wherein the laser source provides multi-wavelength laser beams.

In some example implementations of the LIDAR system of any preceding example implementation, or any combination of preceding example implementations, the optical detector comprises a multi-mode waveguide.

In some example implementations of the LIDAR system of any preceding example implementation, or any combination of preceding example implementations, the lensing optics further comprise lensing to collimate the laser beam through the polarization beam splitter.

In some example implementations of the LIDAR system of any preceding example implementation, or any combination of preceding example implementations, the lensing optics, the laser source, and optical detector are on a same printed circuit board, or photonic integrated circuit, with a fold mirror to direct the returned light to the optical detector.

In some example implementations of the LIDAR system of any preceding example implementation, or any combination of preceding example implementations, the LIDAR system further comprises a second laser source, wherein the laser source and the second laser source each provide multi-wavelength laser beams.

In some example implementations of the LIDAR system of any preceding example implementation, or any combination of preceding example implementations, the lensing optics further comprise includes a reflector or a coating to generate the return light as the local oscillator signal.

In some example implementations of the LIDAR system of any preceding example implementation, or any combination of preceding example further comprise further comprising a second fast scanning mirror, wherein the first fast scanning mirror is to scan across a first axis and the second fast scanning mirror is to scan across a second axis.

In some example implementations of the LIDAR system of any preceding example implementation, or any combination of preceding example further comprise a control system, the control system comprising a processing device to: control optical drivers of active optical circuit elements; control motion operation of the scanning mirrors; and process the signals received from the optical detectors to generate a point cloud of a three-dimensional space.

In some example implementations of the LIDAR system of any preceding example implementation, or any combination of preceding example further comprise one or more imaging devices, wherein the imaging devices capture images.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 1A and 1B illustrate an optical scanning system of a typical light detection and ranging (LIDAR) system to steer a laser beam to scan a scene, and illustrating decentering of the return laser beam at the fiber tip;

DETAILED DESCRIPTION

Figure 2:
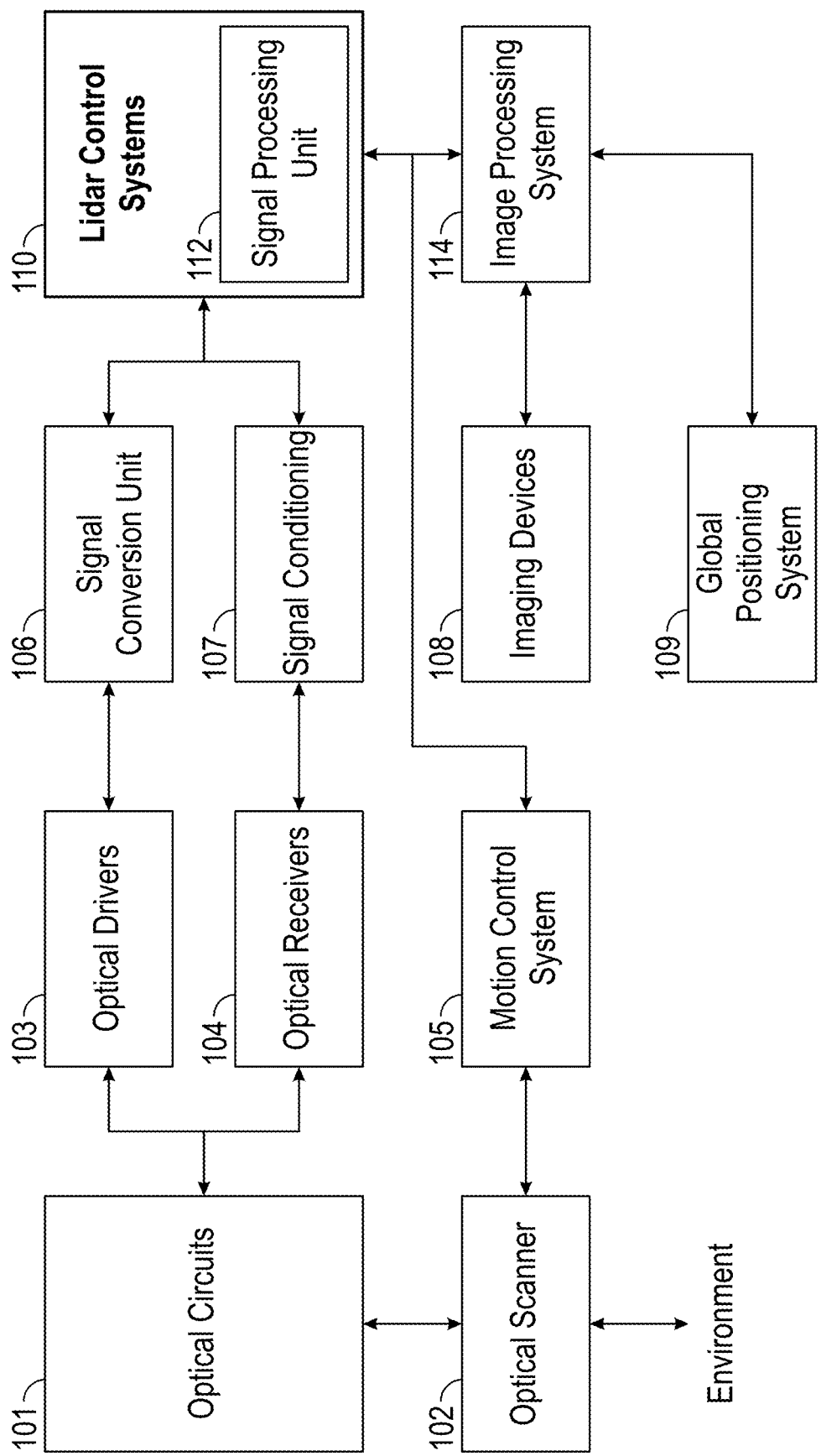
FIG. 2 illustrates a LIDAR system according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

FIG. 2 illustrates a LIDAR system 100 according to example implementations of the present disclosure. The LIDAR system 100 includes one or more of each of a number of components, but may include fewer or additional components than shown in FIG. 2. The LIDAR system 100 may be implemented in any sensing market, such as, but not limited to, transportation, manufacturing, metrology, medical, and security systems. For example, in the automotive industry, the described beam delivery system becomes the front-end of FMCW devices that can assist with spatial awareness for automated driver assist systems, or self-driving vehicles. As shown, the LIDAR system 100 includes optical circuits 101. The optical circuits 101 may include a combination of active optical components and passive optical components. Active optical components may generate, amplify, or detect optical signals and the like. In some examples, the active optical circuit includes lasers at different wavelengths, one or more optical amplifiers, one or more optical detectors, or the like.

Passive optical circuits may include one or more optical fibers to carry optical signals, and route and manipulate optical signals to appropriate input/output ports of the active optical circuit. The passive optical circuits may also include one or more fiber components such as taps, wavelength division multiplexers, splitters/combiners, polarization beam splitters, collimators or the like. In some embodiments, as discussed further below, the passive optical circuits may include components to transform the polarization state and direct received polarized light to optical detectors using a PBS.

An optical scanner 102 includes one or more scanning mirrors that are rotatable along respective orthogonal axes to steer optical signals to scan an environment according to a scanning pattern. For instance, the scanning mirrors may be rotatable by one or more galvanometers. The optical scanner 102 also collects light incident upon any objects in the environment into a return laser beam that is returned to the passive optical circuit component of the optical circuits 101. For example, the return laser beam may be directed to an optical detector by a polarization beam splitter. In addition to the mirrors and galvanometers, the optical scanning system may include components such as a quarter-wave plate, lens, anti-reflective coated window or the like.

To control and support the optical circuits 101 and optical scanner 102, the LIDAR system 100 includes a LIDAR control systems 110. The LIDAR control systems 110 may function as a processing device for the LIDAR system 100. In some embodiments, the LIDAR control system 110 may include signal processing 112 such as a digital signal processor. The LIDAR control systems 110 are configured to output digital control signals to control optical drivers 103. In some embodiments, the digital control signals may be converted to analog signals through signal conversion unit 106. For example, the signal conversion unit 106 may include a digital-to-analog converter. The optical drivers 103 may then provide drive signals to active components of optical circuits 101 to drive optical sources such as lasers and amplifiers. In some embodiments, several optical drivers 103 and signal conversion units 106 may be provided to drive multiple optical sources.

The LIDAR control systems 112 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some embodiments, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical circuit, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control system 110 or other systems connected to the LIDAR system 100.

In operation according to some examples, the LIDAR system 100 is configured to use nondegenerate laser sources to simultaneously measure range and velocity across two dimensions. This capability allows for real-time, long range measurements of range, velocity, azimuth, and elevation of the surrounding environment. In some example implementations, the system points multiple modulated laser beams to the same target.

In some examples, the scanning process begins with the optical drivers 103 and LIDAR control system 110. The LIDAR control system 110 instructs the optical drivers 103 to independently modulate one or more lasers, and these modulated signals propagate through the passive optical circuit to the collimator. The collimator directs the light at the optical scanning system that scans the environment over a preprogrammed pattern defined by the motion control subsystem. The optical circuits also include a quarter-wave plate to transform the polarization of the light as it leaves the optical circuits 101. A portion of the polarized light may also be reflected back to the optical circuits 101. For example lensing or collimating systems may have natural reflective properties or a reflective coating to reflect a portion of the light back to the optical circuits 101.

Optical signals reflected back from the environment pass through the optical circuits 101 to the receivers. Because the light is polarized, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104. Configuration of optical circuits 101 for polarizing and directing beams to the optical receivers 104 are described further below.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometer as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

As explained in the Background and Brief Summary sections, traditional LIDAR systems provide either a flooding of light into a scene or scan the scene with a raster pattern. When using a raster pattern, the laser is pulsed and analyzed upon return to provide distance, velocity and other data. The collected data points can be combined into a point cloud to generate a scene. The framerate generated for the scene is at least partially a function of scan speed of the laser. For example, the faster the laser can scan, the more points it can take in a period of time. Typically, the scene may be generated with two mirrors, one which scans across a first axis and one which scans across a second axis. However, these systems can suffer from degraded target signals when the scanning mirrors are rotated at a high angular velocity (>3000 degrees per second). The time it takes a chirped laser pulse (frequency sweep) to reach the target and return to the scanning system, the mirror moves due to its high angular velocity, and this slight angle deviation of the fast scanning mirror causes a walk-off of the target signal at the fiber tip. This walk-off is more problematic with fiber tips of smaller diameter. For example, a single mode fiber tip may be approximately 10 μm. Thus, a few microns of walk-off can have a significant impact on such systems' detected signal strength.

Example implementations of the present disclosure separate the source fiber from the optical receiver. This separation allows larger fibers such as multi-mode fibers being utilized as receivers. Additionally, other types of optical detectors can be used. Accordingly the systems can combine the pulsed laser light from the target with reflected local light within a polarization beam splitter. Each of the locally returned light and target return light may be polarized after generated by an optical source. Upon return the polarized light can be reflected to a separate optical detector than the optical source fiber. Because the polarized light has already interfered within the return path, the optical detector can be a larger detector than a single mode fiber in the source path. For example, the optical detector can be a silicon based detector, a multi-mode fiber, large area detector, or the like.

Figure 3:
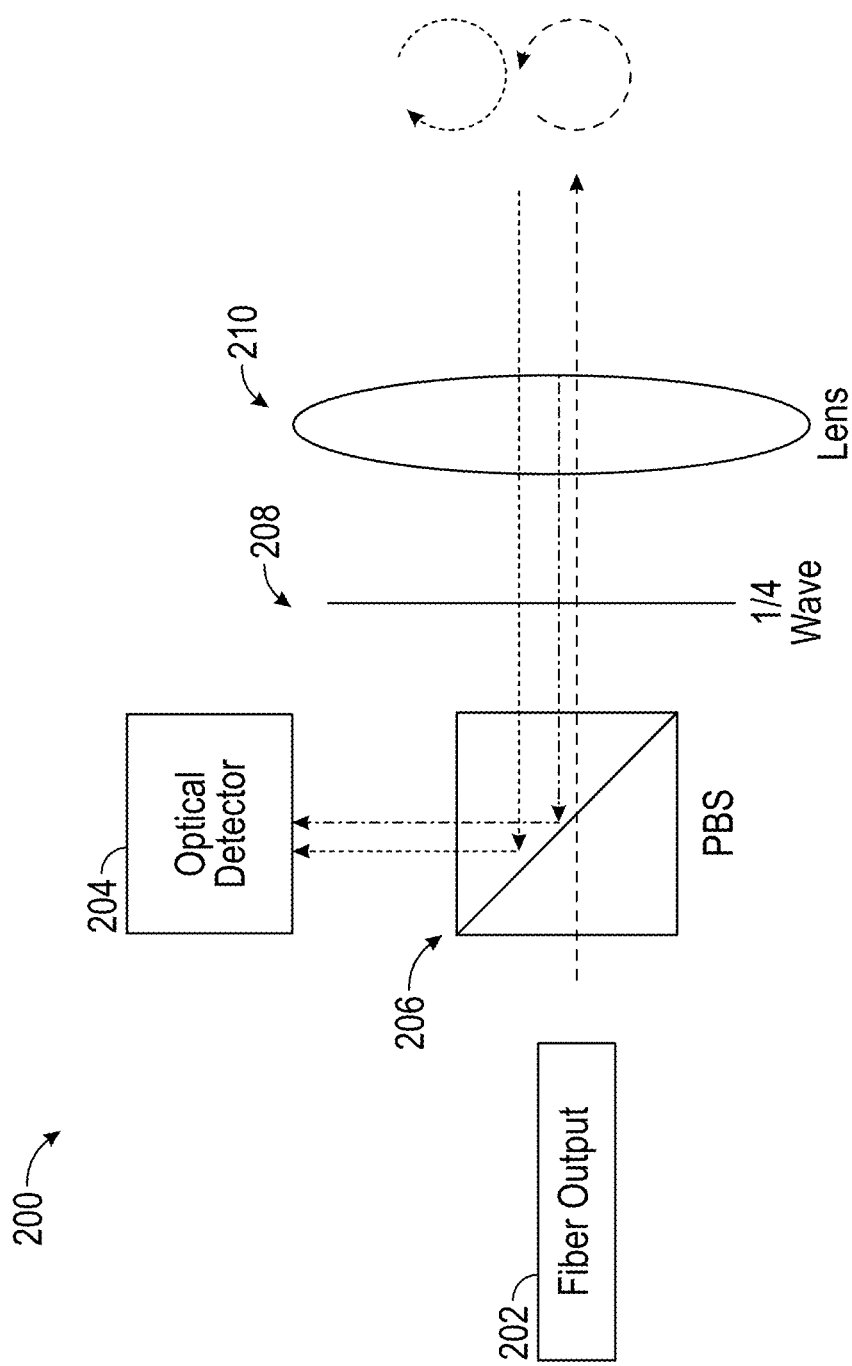
FIG. 3 illustrates aspects of optical circuits and optical scanning system of the LIDAR system of FIG. 2, according to some example implementations.

FIG. 3 illustrates aspects of the optical circuits 200 of a scanning system. For example, the optical circuits 200 of FIG. 3 may be part of optical circuits 101 of the LIDAR system 100 as shown with respect to FIG. 2 above of the LIDAR system 100, according to some example implementations. As shown, a fiber output 202 is configured to provide a laser beam to passive optical components of a LIDAR system. For example, the fiber output 202 may be a laser source. The laser beam may pass through the polarization beam splitter 206 as non-polarized light. After passing the polarization beam splitter 206, the laser beam can be polarized by use of a ¼ wave plate 208. The laser beam will then be polarized with circular polarization. Lensing 210 may be used to focus the light. In some embodiments, the lens may also reflect a portion of the polarized light back toward the fiber output 202. In some embodiments, a separate mirror, micro-lens array, filter, or reflective coating may be used.

The reflected portion of the light becomes a local oscillator for interference with returned light from a target.

After passing through the lens 210, the laser beam is transmitted to the environment and a portion of the pulse may reflect back from one or more objects. For example, the light may be transmitted to the environment by one or more fast scanning mirrors as discussed with respect to FIG. 2 in a raster pattern. A portion of the reflected light may be returned in the direction of the fiber output 202. Because the light returned by from the target environment and the light reflected from the lens 210 are polarized, when they are returned to the polarized beam splitter 206, rather than passing back to the fiber output 202, it is reflected to an optical detector 204. As discussed above, the optical detector 204 can be a silicon based detector, a multi-mode fiber, large area detector, or the like. The local oscillator signal and the signal from the target have interfered to generate a combined signal. Accordingly, there is no need to have the two interfere within a fiber. The combined signal can then be used to interpret distance, velocity, or other factors about the environment at the target point.

Figure 4:
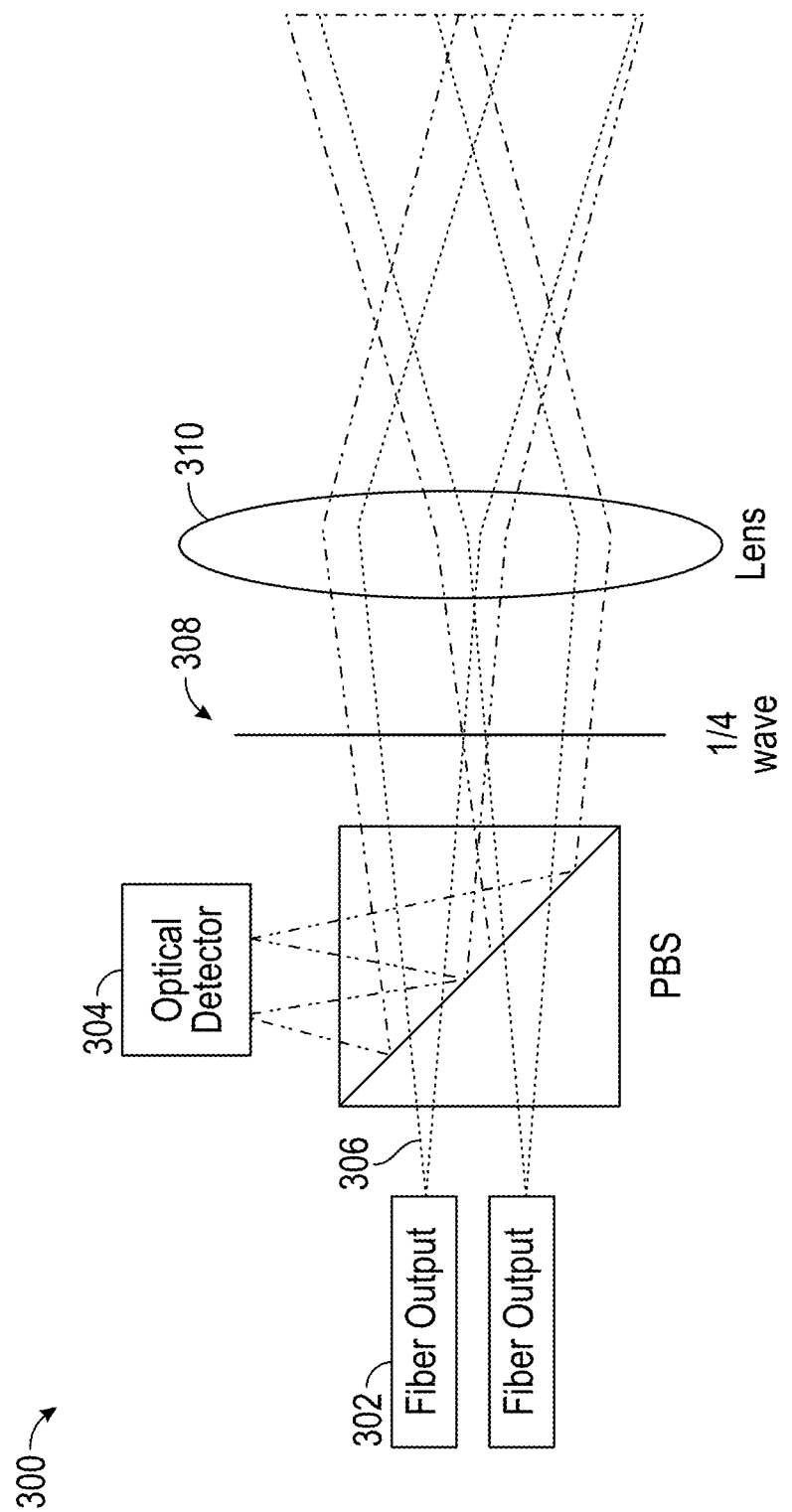
FIG. 4 illustrates aspects of optical circuits and optical scanning system of a LIDAR, according to some example implementations.

FIG. 4 illustrates aspects of the optical circuits 300 of a scanning system. For example, the optical circuits 300 of FIG. 4 may be part of optical circuits 101 as shown with respect to FIG. 2 above of the LIDAR system 100, according to some example implementations. As shown, optical circuits 300 include multiple fiber outputs 302 and multiple optical detectors 304. The multiple fiber outputs 302 and optical detectors 304 may provide multiple data points during a single time interval. Accordingly, fewer rotations of the fast scanning mirrors may provide additional data. The remaining portions of the optical circuits 300 may be the same or similar to those described above with reference to FIG. 3. For example, the optical circuits 300 may include a ¼ wave plate 308 to polarize light, lensing 310 to provide reflected light, and the like. In some embodiments, the alignment of the polarized beam splitter 306 may be set such that the fiber outputs 302 and optical detectors 304 are aligned when returned light is reflected. In some embodiments, there may be multiple fiber outputs 302 and multiple optical detectors 304, but also multiple polarized beam splitters 306. The signals received at each of the optical detectors 304 may be analyzed separately to generate distance or velocity data at a point. In some embodiments, the fiber outputs 402 may provide a laser beam at different wavelengths.

Figure 5:
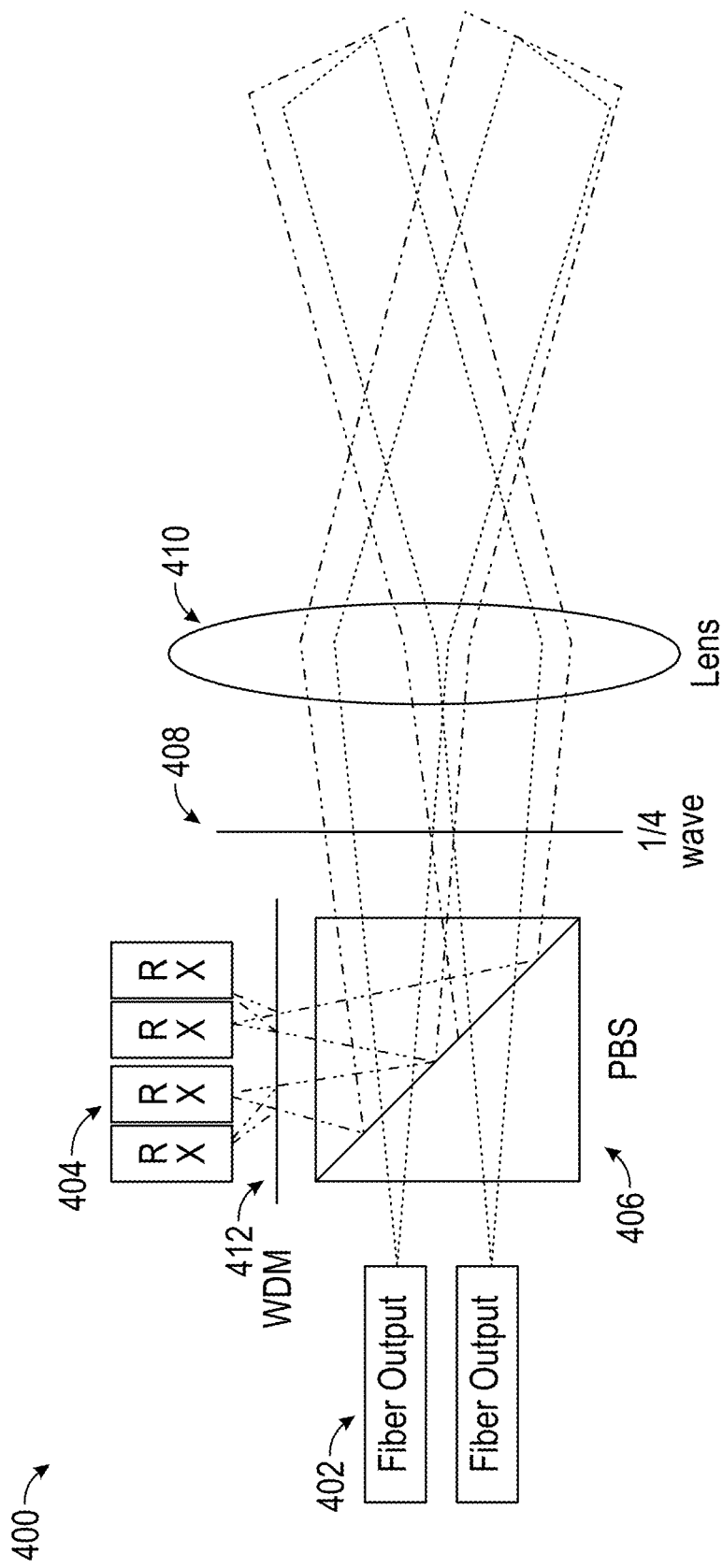
FIG. 5 illustrates aspects of optical circuits and optical scanning system of a LIDAR, according to some example implementations.

FIG. 5 illustrates aspects of the optical circuits 400 of a scanning system. For example, the optical circuits 400 of FIG. 4 may be part of optical circuits 101 as shown with respect to FIG. 2 above of the LIDAR system 100, according to some example implementations. As shown, optical circuits 400 include multiple fiber outputs 402 and multiple optical detectors 404. The multiple fiber outputs 402 and optical detectors 404 may provide multiple data points during a single time interval as discussed with respect to optical circuits 300 with reference to FIG. 4.

Additionally, the fiber outputs 402 provide laser beams at multiple wavelengths. Accordingly, additional data points can be generated from the different wavelengths. In some embodiments, the wavelengths may be detected at different optical detectors 404. Therefore, the wavelengths may be separated by a diffraction grating 412. This directs each of the laser beams with different wavelengths of light to a respective optical detector 404. Accordingly, as shown with two fiber outputs 402, four optical detectors 404 can generate signals for analysis. This provides four total data points and additional information about the environment. In some embodiments, a mirror (not shown) is provided after the wavelength division multiplexer. Accordingly, the optical detectors may be placed at a different location than as shown in FIG. 5 and the mirror may direct the light toward the detectors. This can provide the benefit of giving the divergent wavelength beams further distance to diverge prior to reaching the optical detectors 404 while not requiring the detectors to be moved further from the polarization beam splitter.

Figure 6:
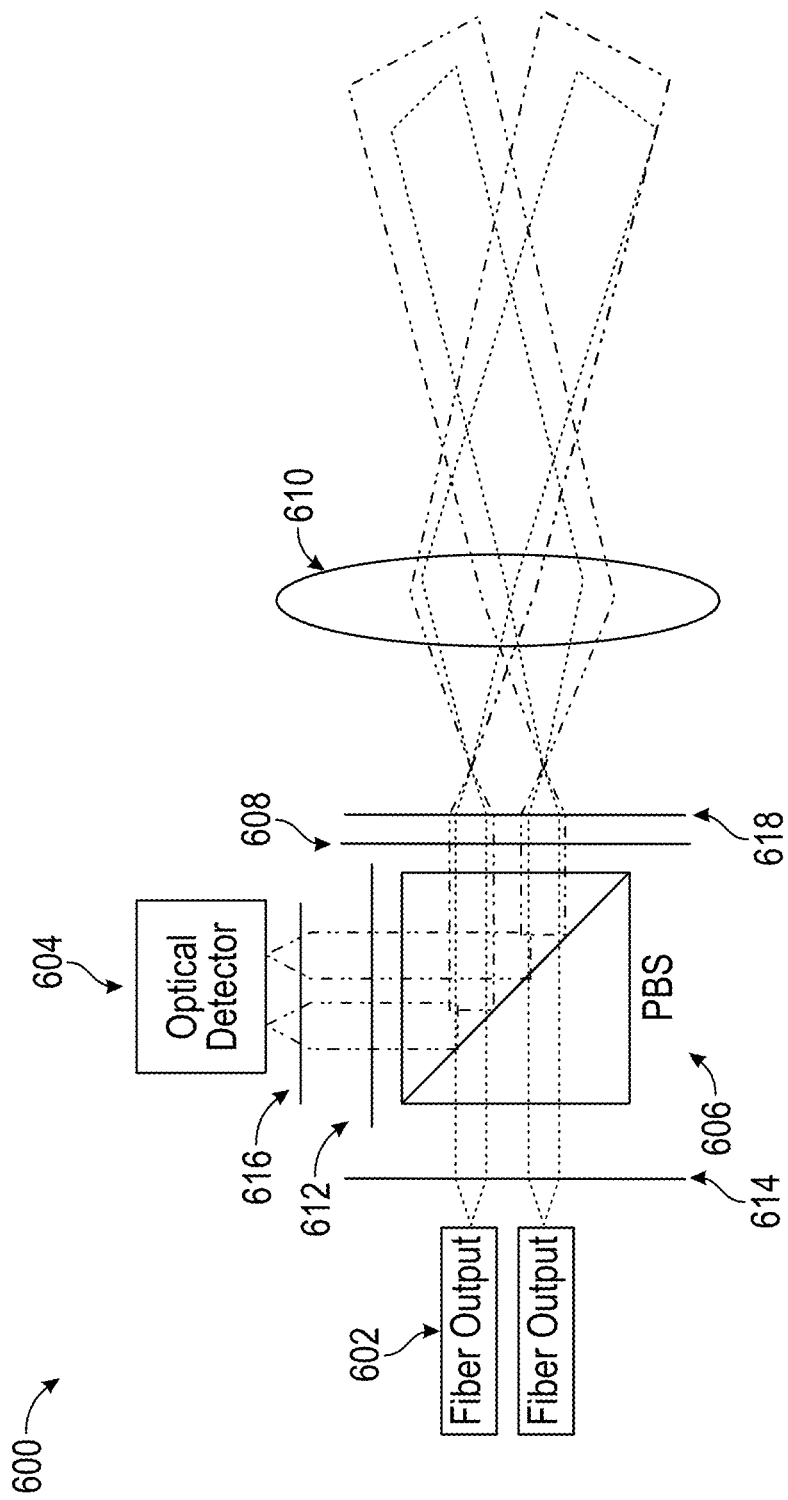
FIG. 6 illustrates aspects of optical circuits and optical scanning system of a LIDAR, according to some example implementations.

FIG. 6 illustrates aspects of the optical circuits 600 of a scanning system. For example, the optical circuits 600 of FIG. 6 may be part of optical circuits 101 as shown with respect to FIG. 2 above of the LIDAR system 100, according to some example implementations. As shown, optical circuits 600 include multiple fiber outputs 602 and multiple optical detectors 604, however, in various embodiments, the optical circuits 600 could include fewer or additional fiber outputs 602 or optical detectors 604. A quarter wave plate 608 may transform the polarization state of light in the optical circuits 600. Additionally, the optical circuits 600 include one or more micro-lens arrays 614, 616, 618 to collimate the beams within the polarization beam splitter 606. Collimated light may improve alignment and tolerance of laser beams within the polarization beam splitter 606. For example, a first micro-lens array 614 may collimate light leaving the fiber output 602, a second micro-lens array 618 may de-collimate light into the target environment. The laser can then be collimated when entering the polarization beam splitter 606. As shown in FIG. 6, optical circuits include a wavelength division multiplexer 612, however, collimation of light within optical circuits 600 could be performed with a single wavelength fiber output 602 and now wavelength division multiplexer 612. In some embodiments, the optical circuits 600 include micro-lens array 616 to converge the laser beams at the optical detectors 604.

Figure 7A:
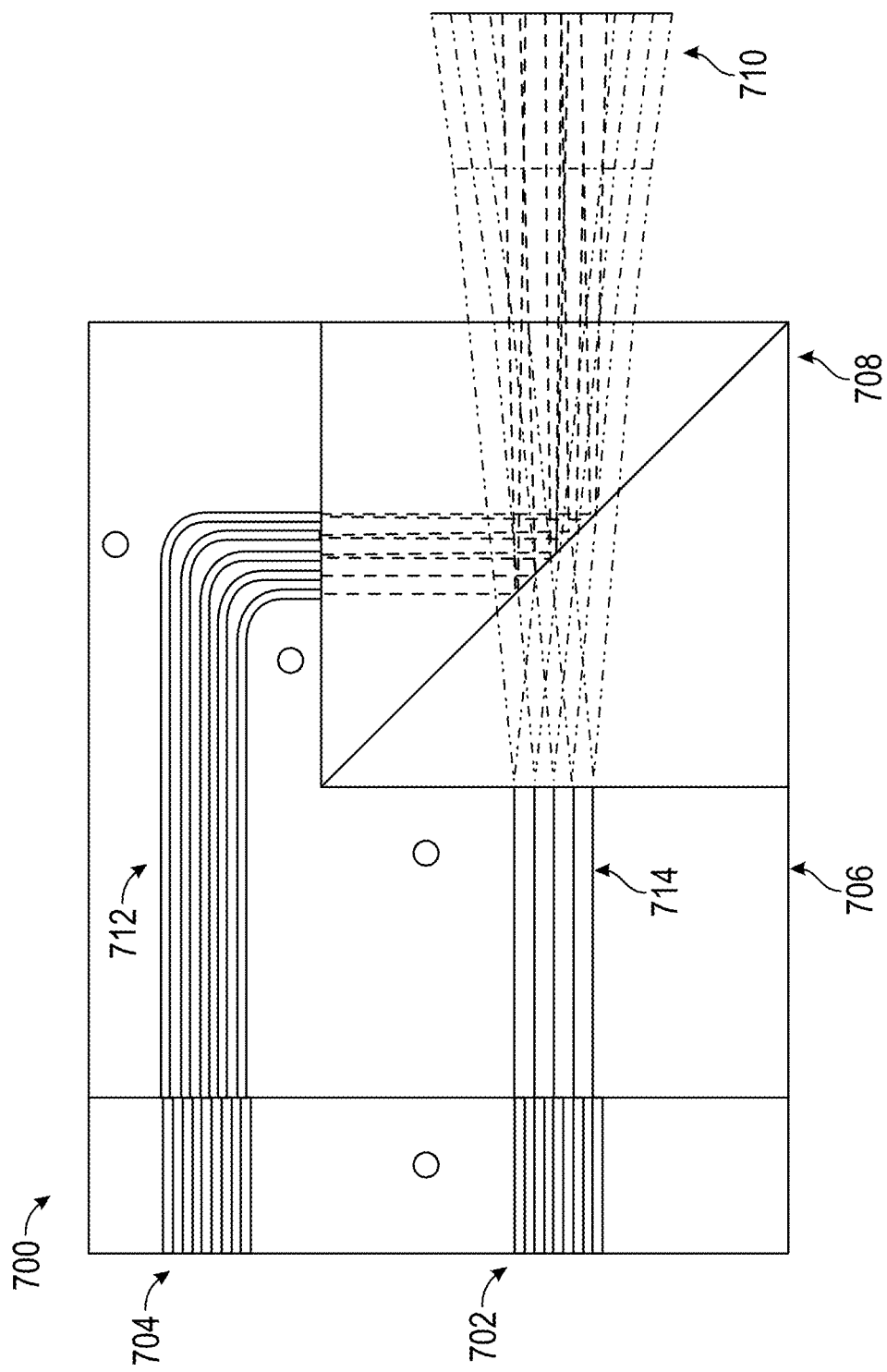
FIG. 7A illustrates aspects of optical circuits and optical scanning system of a LIDAR, according to some example implementations.
Figure 7B:
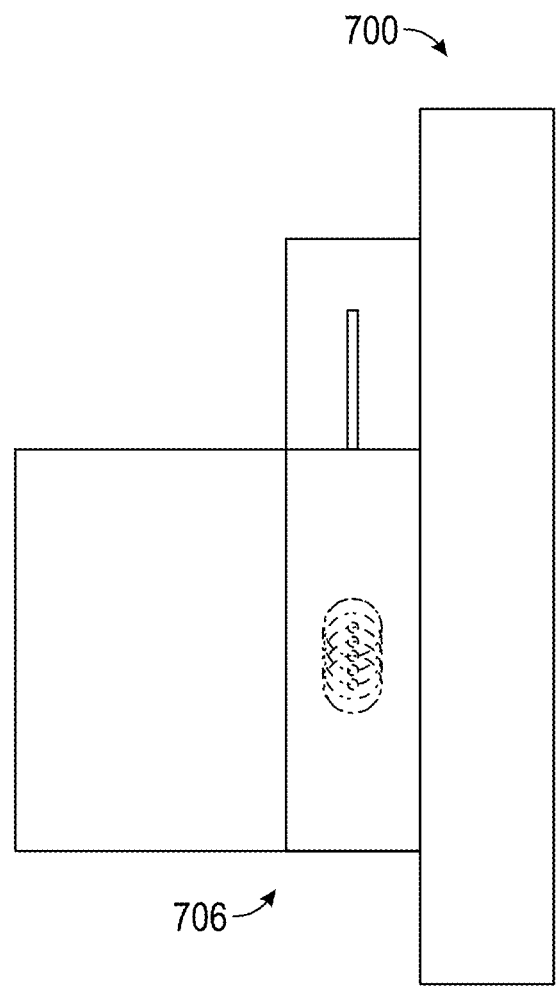
FIG. 7B illustrates aspects of optical circuits and optical scanning system of a LIDAR, according to some example implementations.

FIG. 7A provides a diagram of top view 700 of an example structure for implementing the optical circuits as described herein. The optical circuits 700 include a fiber output 702, optical detectors 704, a polarization beam splitter 706, a quarter wave plate 708, and a lens 710. In some embodiments, the lens may include a coating after the quarter wave-plate 708 or another structure to reflect some light back to the fiber output 702 after polarization of the light. Additional light may be received from the environment and interfere with the local oscillator signal within the polarization beam splitter 706. The polarization beam splitter can then reflect the combined signal to optical detectors 704. As shown in FIGS. 7A and 7B, the implementation includes a number of single-mode fibers 712 for the optical output and a number of multi-mode fibers 714 for the optical detectors. Accordingly, the multi-mode fibers 714 have a larger are than the single-mode fibers 712. This reduces the chance of walk-off on the receiving multi-mode fibers 712. FIG. 7B provides a diagram of side view of an example silicon structure 700 for implementing the optical circuits as described herein. As shown, the polarization beam splitter 706 is attached to the circuit board and extends above the surface of the circuit board.

Figure 8A:
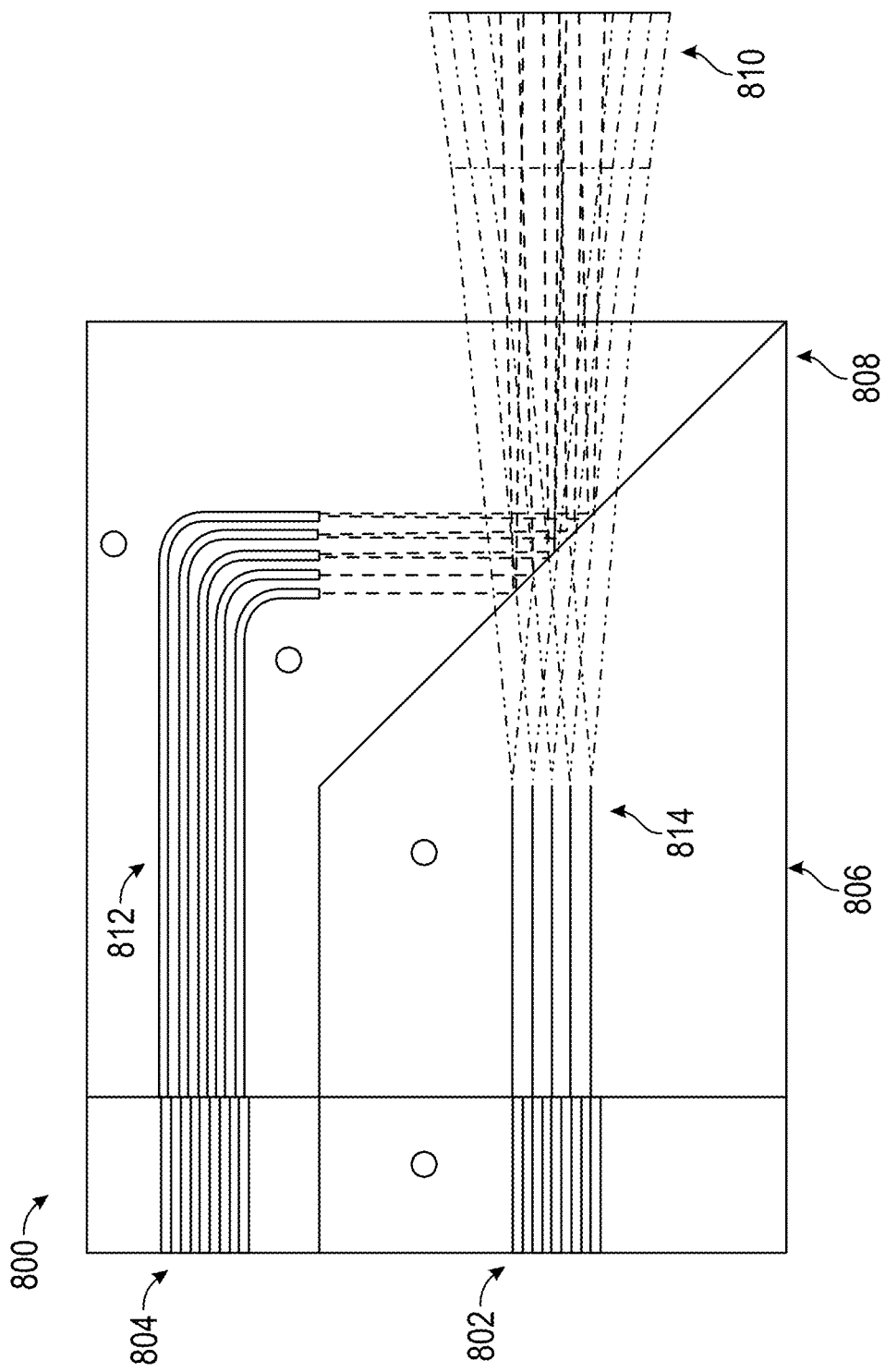
FIG. 8A illustrates aspects of optical circuits and optical scanning system of a LIDAR, according to some example implementations.
Figure 8B:
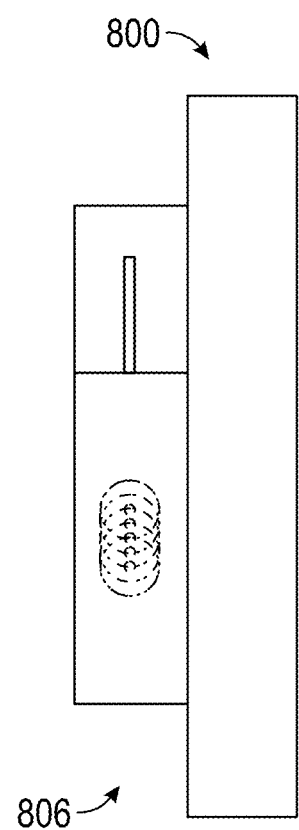
FIG. 8B illustrates aspects of optical circuits and optical scanning system of a LIDAR, according to some example implementations.

FIG. 8A provides a diagram of an example structure for implementing the optical circuits as described herein. The optical circuits 800 include a fiber output 802, optical detectors 804, a polarization beam splitter 806, a quarter wave plate 808, and a lens 810. As shown, the quarter wave plate 806 is coated on the polarization beam splitter 806. In some embodiments, the lens 810 may be a coating after the quarter wave-plate 808 or another structure such as a micro-lens array to reflect some light back to the fiber output 802 after polarization of the light. Additional light may be received from the environment and interfere with the local oscillator signal within the polarization beam splitter 806. The polarization beam splitter can then reflect the combined signal to optical detectors 804. As shown in FIG. 8A, the implementation includes a number of single-mode fibers 812 for the optical output and a number of multi-mode fibers 814 for the optical detectors. Accordingly, the multi-mode fibers 814 have a larger are than the single-mode fibers 812. This reduces the chance of walk-off on the receiving multi-mode fibers 114. FIG. 8B provides a diagram of side view of an example silicon structure 800 for implementing the optical circuits as described herein. As shown, the polarization beam splitter 806 is integrated with the surface board for a lower profile chip. This can provide a compact implementation for the optical systems.

Figure 9:
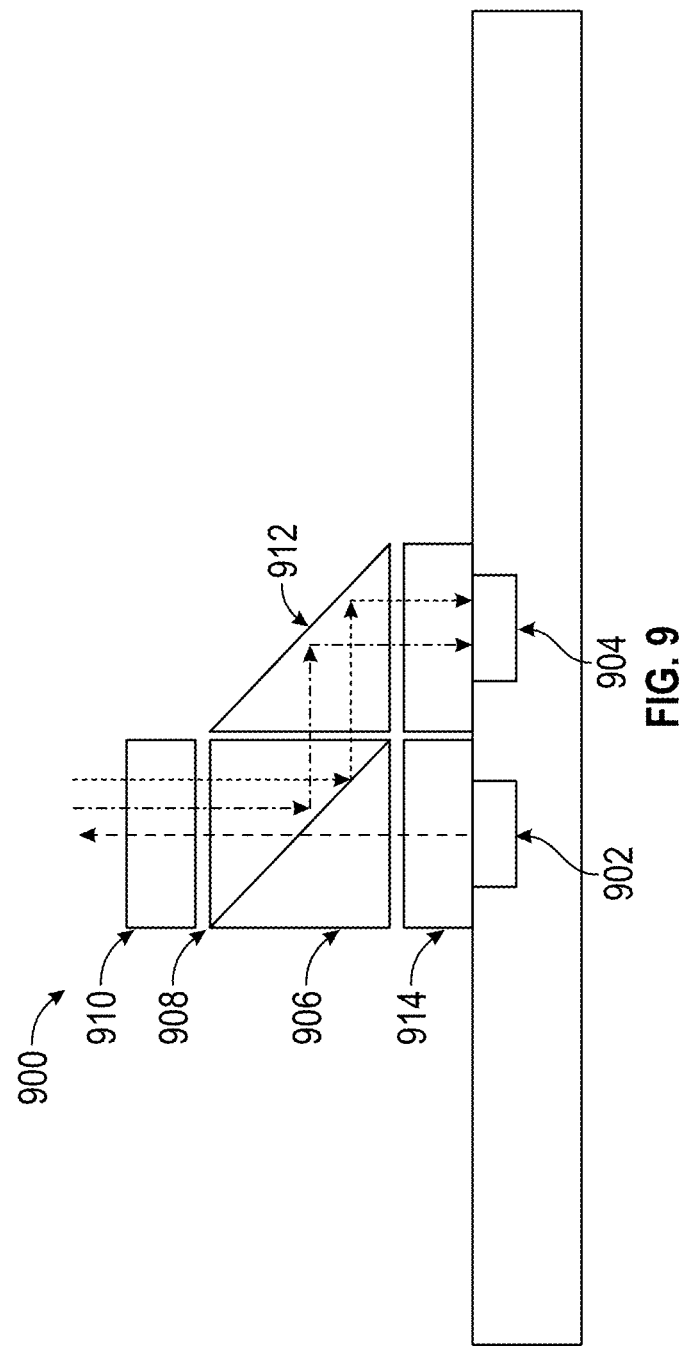
FIG. 9 illustrates aspects of optical circuits and optical scanning system of a LIDAR, according to some example implementations.

FIG. 9 provides a diagram of an example silicon structure 900 for implementing the optical circuits as described herein. As shown, the optical source 902 and the detector 904 are implemented on a single printed circuit board 914. In order to accomplish the planar distribution of the optical source 902 and detector 904, a fold mirror 912 is incorporated into the design of the optical circuits 900. Accordingly, after polarized light is received at the polarization beam splitter 908, it is reflected toward the fold mirror 912. The example structure shown in FIG. 9 may also include a μlens 914 that collimates the light leaving the optical source 902 and returned to the detector 904.

Figure 10:
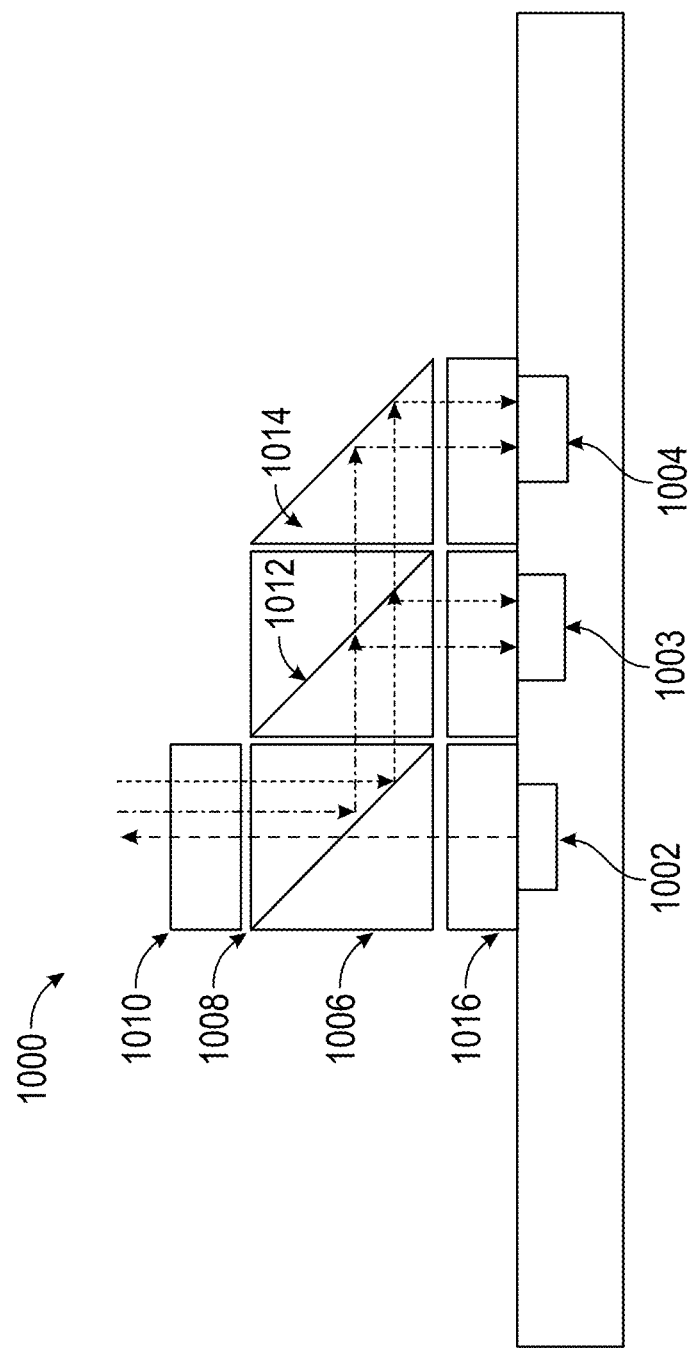
FIG. 10 illustrates aspects of optical circuits and optical scanning system of a LIDAR, according to some example implementations.

In additional embodiments, as shown in FIG. 10, different wavelengths of light could be provided by the optical source 1002. These may be differentiated by a wavelength division multiplexer coating on a first of the fold mirrors 1012, while the remaining wavelengths are passed through. The fold mirror 1012 may be a cube instead of a prism to avoid refraction of light passing through the fold mirror 1012. In this case to a second fold mirror 1014. In some embodiments, additional fold mirrors with different wavelength division multiplexers can be used to further differentiate other frequencies of light. Additionally, optical circuits 1000 may have multiple optical detectors 1003 and 1004. In some embodiments, these may each be optimized for the particular wavelength of light which is directed toward the detector based on the fold mirrors and wavelength division multiplexer. The example structure shown in FIG. 10 may also include a μlens 1016 that collimates the light leaving the optical source 1002 and returned to the detectors 1003 and 1004.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A light detection and ranging (LIDAR) apparatus comprising:
    a laser source configured to emit a laser beam in a first direction;
    lensing optics configured to pass a first portion of the laser beam in the first direction toward a target, return a second portion of the laser beam into a return path as a local oscillator signal, and return a target signal into the return path;
    a polarization wave plate configured to polarize the laser beam headed in the first direction and polarize the target signal returned through the lensing optics;
    a polarization beam splitter configured to pass a first polarization state of light through the beam splitter in the first direction and reflect a second polarization state of light in a second direction different than the first direction, wherein the polarization beam splitter is further configured to enable interference between the local oscillator signal and the target signal to generate a combined signal; and
    an optical detector configured to receive the combined signal from the second direction, wherein the optical detector comprises a multi-mode waveguide to receive the combined signal at various positions as reflected from the polarization beam splitter.

2. The light detection and ranging (LIDAR) apparatus of claim 1, further comprising a second laser source and a second optical detector.

3. The light detection and ranging (LIDAR) apparatus of claim 1, further comprising a wavelength division multiplexer to direct the signals to the optical detector and a second optical detector based on wavelength and wherein the laser source provides multi-wavelength laser beams.

4. The light detection and ranging (LIDAR) apparatus of claim 1, wherein the polarization wave plate comprises one of a quarter-wave plate or a half-wave plate.

5. The light detection and ranging (LIDAR) apparatus of claim 1, further comprising lensing to collimate the laser beam through the polarization beam splitter.

6. The light detection and ranging (LIDAR) apparatus of claim 1, wherein the laser source and optical detector are on a printed circuit board or boards with a fold mirror or mirrors to direct the returned light to the optical detectors.

7. The light detection and ranging (LIDAR) apparatus of claim 6, wherein the fold mirror further comprises a wavelength division multiplexer coating to reflect a first wavelength of light to the optical detector and allow a second wavelength of light to pass to a second fold mirror and reflect to a second optical detector.

8. The light detection and ranging (LIDAR) apparatus of claim 1, further comprising a second laser source, wherein the laser source and the second laser source each provide multi-wavelength laser beams.

9. The light detection and ranging (LIDAR) apparatus of claim 1, wherein the lensing optics further comprise a reflector or a coating to generate the return light as the local oscillator signal.

10. A light detection and ranging (LIDAR) system comprising:
    a fast scanning mirror to direct a laser beam in a raster pattern to scan an environment;
    optical circuits to generate and receive the laser beam, the optical circuits comprising:

a laser source configured to emit a laser beam in a first direction;

lensing optics configured to pass a first portion of the laser beam in the first direction toward a target, return a second portion of the laser beam into a return path as a local oscillator signal, and return a target signal into the return path;

a QWP configured to transform the polarization states of the laser beam headed in the first direction and of the target signal returned through the lensing optics such that these polarizations are orthogonal;

a polarization beam splitter configured to pass polarized light through the beam splitter in the first direction and reflect orthogonally polarized light in a second direction different than the first direction, wherein the polarization beam splitter is further configured to enable interference between the local oscillator signal and the target signal to generate a combined signal; and an optical detector configured to receive the combined signal, wherein the optical detector comprises a multi-mode waveguide to receive the combined signal at various positions as reflected from the polarization beam splitter.

11. The light detection and ranging (LIDAR) system of claim 10, further comprising a second laser source and a second optical detector.

12. The light detection and ranging (LIDAR) system of claim 10, further comprising a wavelength division multiplexer to direct the signals to the optical detector and a second optical detector based on wavelength and wherein the laser source provides multi-wavelength laser beams.

13. The light detection and ranging (LIDAR) system of claim 10, further comprising lensing to collimate the laser beam through the polarization beam splitter.

14. The light detection and ranging (LIDAR) system of claim 10, wherein the laser source and optical detector are on a same printed circuit board with a fold mirror to direct the returned light to the optical detector.

15. The light detection and ranging (LIDAR) system of claim 10, further comprising a second laser source, wherein the laser source and the second laser source each provide multi-wavelength laser beams.

16. The light detection and ranging (LIDAR) system of claim 10, wherein the lensing optics includes a reflector or a coating to generate the return light as the local oscillator signal.

17. The light detection and ranging (LIDAR) system of claim 10, further comprising a second fast scanning mirror, wherein the first fast scanning mirror is to scan across a first axis and the second fast scanning mirror is to scan across a second axis.

18. The system of claim 10, further comprising a control system, the control system comprising a processing device to:
control optical drivers of active optical circuits;
control motion operation of the fast scanning mirror; and
process signal received from the optical detectors to generate a point cloud of a three-dimensional space.

19. The light detection and ranging (LIDAR) system of claim 10, further comprising one or more imaging devices, wherein the imaging devices capture images of the environment.

* * * * *